(12) United States Patent
Abouelseoud

(10) Patent No.: US 10,813,109 B2
(45) Date of Patent: Oct. 20, 2020

(54) DISTRIBUTED SCHEDULING PROTOCOL WITH DIRECTIONAL TRANSMISSION KNOWLEDGE

(71) Applicant: SONY CORPORATION, Tokyo (JP)

(72) Inventor: Mohamed Abouelseoud, San Francisco, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/274,870

(22) Filed: Feb. 13, 2019

(65) Prior Publication Data

US 2020/0120689 A1   Apr. 16, 2020

Related U.S. Application Data

(60) Provisional application No. 62/744,197, filed on Oct. 11, 2018.

(51) Int. Cl.
*H04W 72/12* (2009.01)
*H04W 72/04* (2009.01)
(Continued)

(52) U.S. Cl.
CPC .......... *H04W 72/1215* (2013.01); *H04B 1/69* (2013.01); *H04B 7/0619* (2013.01);
(Continued)

(58) Field of Classification Search
CPC ......... H04W 72/1215; H04W 72/0446; H04W 74/002; H04W 16/28; H04W 40/244;
(Continued)

(56) References Cited

U.S. PATENT DOCUMENTS 8,570,970 B2 * 10/2013 Hsu .................. H04W 74/02
370/329
10,524,275 B2 * 12/2019 Park .................. H04W 84/12
(Continued)

FOREIGN PATENT DOCUMENTS

WO   2018049113 A1   3/2018
WO   2018083915 A1   5/2018

OTHER PUBLICATIONS

ISA/EP, European Patent Office (EPO), International Search Report and Written Opinion dated Dec. 3, 2019, related PCT international application No. PCT/IB2019/057169, pp. 1-19, claims searched, pp. 20-25.
(Continued)

*Primary Examiner* — Sharad Rampuria
(74) *Attorney, Agent, or Firm* — O'Banion & Ritchey LLP; John P. O'Banion

(57) ABSTRACT

A wireless communication apparatus/system/method utilizing directional data transmission over a communication (e.g., mmW) band and a distributed scheduling protocol toward improving spectrum sharing and interference mitigation with other stations and BSSs that are also using the distributed schedule protocol. Transmitting directional transmission information containing sector directions and channel use time within beacons or messages being sent, such as EDMG beacons. Receiving and processing directional transmission information from other stations, and allocating channels and scheduling future transmissions based on the processed directional transmission information.

20 Claims, 18 Drawing Sheets

(51) Int. Cl.
| | |
|---|---|
| *H04B 7/06* | (2006.01) |
| *H04B 1/69* | (2011.01) |
| *H04W 16/28* | (2009.01) |
| *H04W 74/00* | (2009.01) |
| *H04W 40/24* | (2009.01) |

(52) U.S. Cl.
CPC ....... *H04W 16/28* (2013.01); *H04W 72/0446* (2013.01); *H04W 74/002* (2013.01); *H04B 7/0617* (2013.01); *H04W 40/244* (2013.01)

(58) Field of Classification Search
CPC ..... H04W 72/04; H04W 72/12; H04W 76/00; H04B 1/69; H04B 7/0619; H04B 7/0617; H04B 7/2121; H04B 7/2123; H04J 2203/0069; H04Q 2213/394
See application file for complete search history.

(56) References Cited

U.S. PATENT DOCUMENTS

| | | |
|---|---|---|
| 2015/0382171 A1 | 12/2015 | Roy et al. |
| 2017/0086211 A1 | 3/2017 | Sahin et al. |
| 2019/0229796 A1* | 7/2019 | Wee .................... H04B 7/0623 |

OTHER PUBLICATIONS

Assasa, Hany et al., "Extending the IEEE 802.11ad Model: Scheduled Access, Spatial Reuse, Clustering, and Relaying", In Proceedings of the 2017 Workshop on ns-3, Porto, Portugal, Jun. 2017 (WNS3 2017), 8 pages.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| 2 | 2 | 6 | 6 | 3 | 3 | 4 |

Octets:

FIG. 7
(Prior Art)

| B0 | B1  B9 | B10  B15 | B16  B17 | B18  B23 |
|---|---|---|---|---|
| Direction | CDOWN | Sector ID | DMG Antenna ID | RXSS Length |
| 1 | 9 | 6 | 2 | 6 |

Bits:

FIG. 8
(Prior Art)

| B0  B8 | B9  B10 | B11  B15 | B16 | B17  B23 |
|---|---|---|---|---|
| Total sectors in ISS | Number of RX DMG antennas | Reserved | Poll Required | Reserved |
| 9 | 2 | 5 | 1 | 7 |

Bits:

FIG. 9A
(Prior Art)

| B0  B5 | B6  B7 | B8  B15 | B16 | B17  B23 |
|---|---|---|---|---|
| Sector select | DMG Antenna select | SNR report | Poll Required | Reserved |
| 6 | 2 | 8 | 1 | 7 |

Bits:

FIG. 9B
(Prior Art)

| Element ID | Length | Element ID Extension | EDMG Allocation Control | Number of Allocations | Channel Allocation 1 | ⋯ | Channel Allocation N |

| Scheduling Type | Channel Aggregation | BW | Asymmetric beamforming | Receive Direction | Transmit Direction | N STS | Nmax STS | Reserved Allocation |

| ISDirectional | Sector ID | DMG Antenna ID |
|---|---|---|
| B0 | B1  B6 | B7  B8 |

Bits:  1    6    2

DISTRIBUTED SCHEDULING PROTOCOL WITH DIRECTIONAL TRANSMISSION KNOWLEDGE

CROSS-REFERENCE TO RELATED APPLICATIONS

This application claims priority to, and the benefit of, U.S. provisional patent application Ser. No. 62/744,197 filed on Oct. 11, 2018, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless local area network (WLAN) communications, and more particularly to a distributed scheduling protocol.

2. Background Discussion

Wireless local area networks (WLANs), especially in the millimeter wavelength (mm-Wave or mmW) regimes, are always seeking to reach higher capacities. Network operators have begun to embrace various concepts to achieve densification, such as in the Millimeter wave (mmW) regime including mesh networks and mixtures of mesh and non-mesh networks, are becoming increasingly important. Current sub-6 GHz wireless technology is not sufficient to cope with high data demands. One alternative is to utilize additional spectrum in the 30-300 GHz band which is often referred to as the millimeter wave band (mmW).

The efficient use of mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up in a location it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A station connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

In present mmW communication systems STAs using TDD SP channel access have no requirement to listen to the channel before using it, which can create issues for other stations trying to fairly access the channel. These other STAs trying to access the channel might be blocked since they are required to sense the medium before using the channel, while the TDD SP Stations are not required to do so. In addition, the present techniques for sensing the medium are subject to false indications of interference.

However, channel scheduling currently provides inefficient directional and time allocation.

Accordingly, a need exists for enhanced scheduling mechanisms for providing more efficient allocations in a wireless local area network (WLAN) network. The present disclosure fulfills that need and provides additional benefits over previous technologies.

BRIEF SUMMARY

A wireless protocol is described for directional WLAN communications in which directional transmission information from neighboring STAs is used to schedule future transmissions. In present systems channel scheduling is inefficient in regards to both directional and time allocations, because allocating these available resources does not take directional information into proper account. In the present disclosure information on channel resources is shared and can be utilized toward increasing the efficiency of the channels, such as reusing a channel when future transmissions are in directions that do not affect previously scheduled transmissions for the channel. This distributed scheduling protocol increases efficiency of sector direction use (space) as well as time allocations (time) on any channel having a specific sector direction.

Stations (STAs) transmit directional transmission information containing sector directions and channel allocations within beacons or messages being sent. This directional transmission information is received from each STA, such as for example it being included in broadcasting DMG beacons to the neighboring STAs with its allocation information and the directions of transmission of these allocations. The STAs that enable the distributed scheduling protocol receive these DMG beacons and parse the information in the DMG beacon to schedule its future transmissions in directions that do not interfere with currently scheduled transmissions. With knowledge of directional information on allocations, each STA can schedule its future transmissions more efficiently.

The directional WLAN system, apparatus and method disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 17 through FIG. 19 is a data field diagram of an extended EDMG scheduling element according to an embodiment of the present disclosure.

DETAILED DESCRIPTION

1. Definition of Terms

Figure 1:
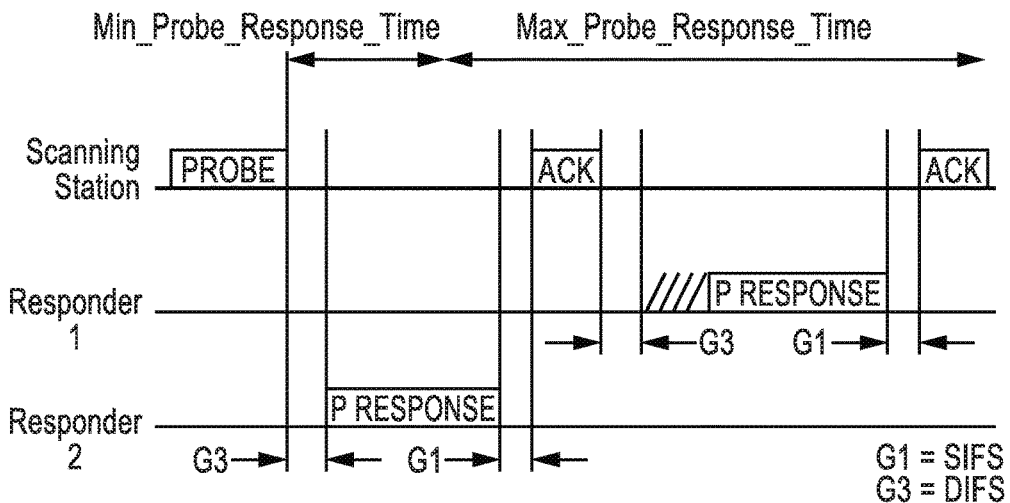
FIG. 1 is a timing diagram of active scanning performed in an IEEE 802.11 wireless local area network (WLAN).

A number of terms are utilized in the disclosure whose meanings are generally described below.

A-BFT: Association-Beamforming Training period; a period announced in the beacons that is used for association and beamform (BF) training of new stations (STAs) joining the network.

AP: Access Point: an entity that contains one station (STA) and provides access to the distribution services, through the wireless medium (WM) for associated STAs.

Beamforming (BF): a directional transmission from a directional antenna system or array for determining information for improving received signal power or signal-to-noise ratio (SNR) at the intended receiver, and under which stations can obtain information for correlating time and directional allocation information.

BSS: Basic Service Set is a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

DMG: Directional Multi-Gigabit is a form of high throughput wireless communications described in IEEE 802.

EDMG: Extended Directional Multi-Gigabit is an extended form of DMG.

DTI: Data Transfer Interval is the period in which full BF training is permitted followed by actual data transfer, and DTI can include one or more service periods (SPs) and contention-based access periods (CBAPs).

LOS: Line-of-Sight, a communication in which the transmitter and receiver are ostensibly within sight of one another, and not the result of communication of a reflected signal; the opposite condition is NLOS for non-line-of-sight in which stations are not in LOS of one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

Omni-directional: a mode of transmission utilizing a non-directional antenna.

PBSS: Personal Basic Service Set (PBSS) defined in 802.1ad, which is similar to an independent BSS (IBSS), but the PBSS is a type of IEEE 802.11 ad hoc network in which STAs are able to communicate directly with each other without relying on special devices like APs.

PCP: PBSS Control Point; in an ad-hoc network one of the participating stations can take the role of the PBSS Control Point, which acts similarly to an AP, announcing the network and organizing accesses.

Quasi-Omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information is collected on received signals, strengths and so forth.

Transmit Sector Sweep (TXSS): is transmission of multiple Sector Sweep (SSW) or Directional Multi-gigabit (DMG) Beacon frames via different sectors, in which a sweep is performed between consecutive transmissions.

2. Existing Directional Wireless Network Technology 2.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received. (b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

2.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
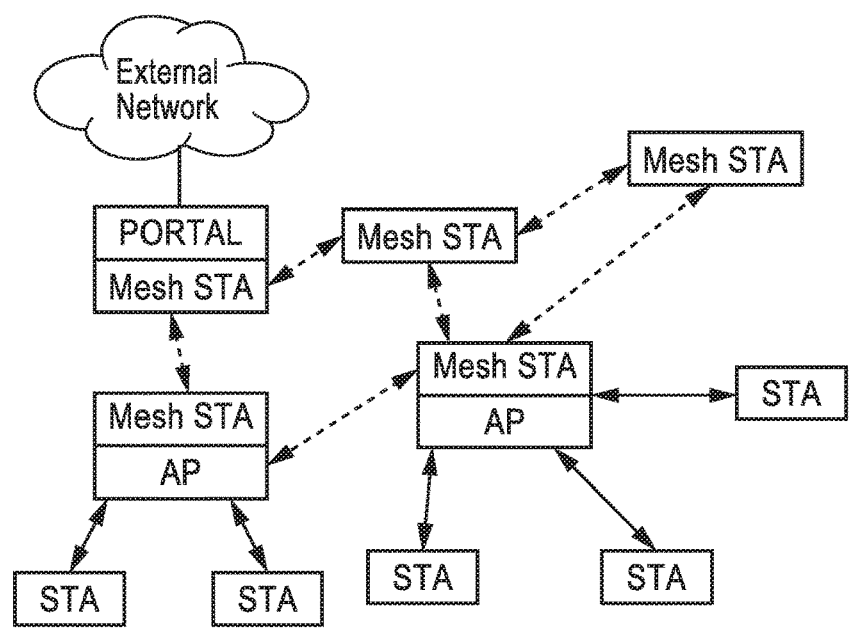
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
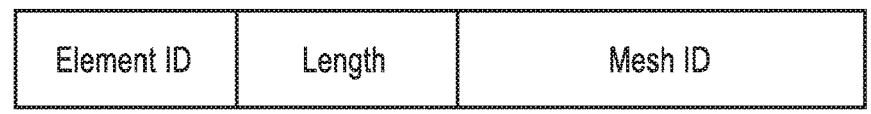
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

2.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

2.4. IEEE 802.11ad Scanning and BF Training

An example of a mmW WLAN state-of-the-art system is the 802.11ad standard.

2.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

2.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

2.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provides the best link quality (e.g. SNR), or will otherwise support communications between the stations.

Figure 5:
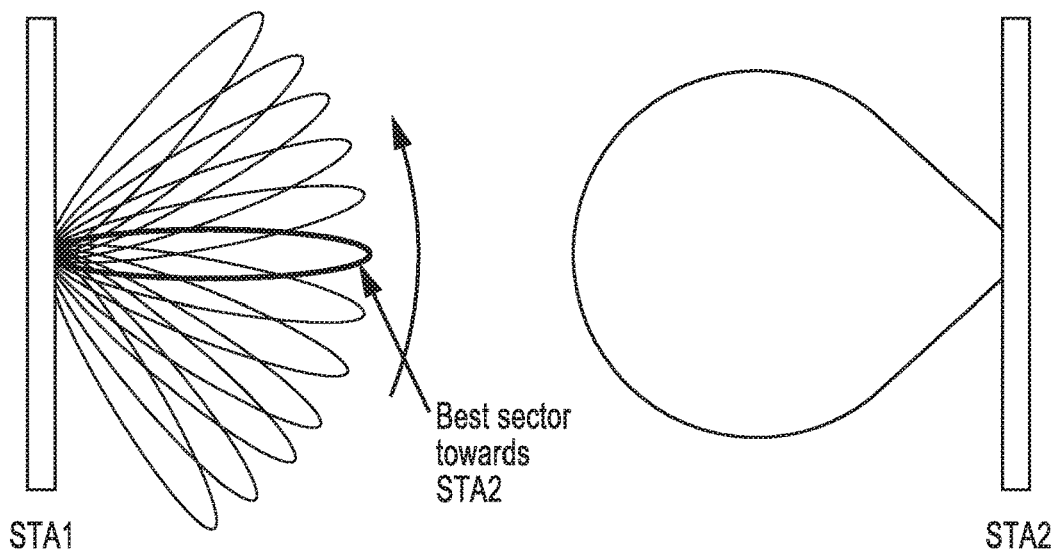
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
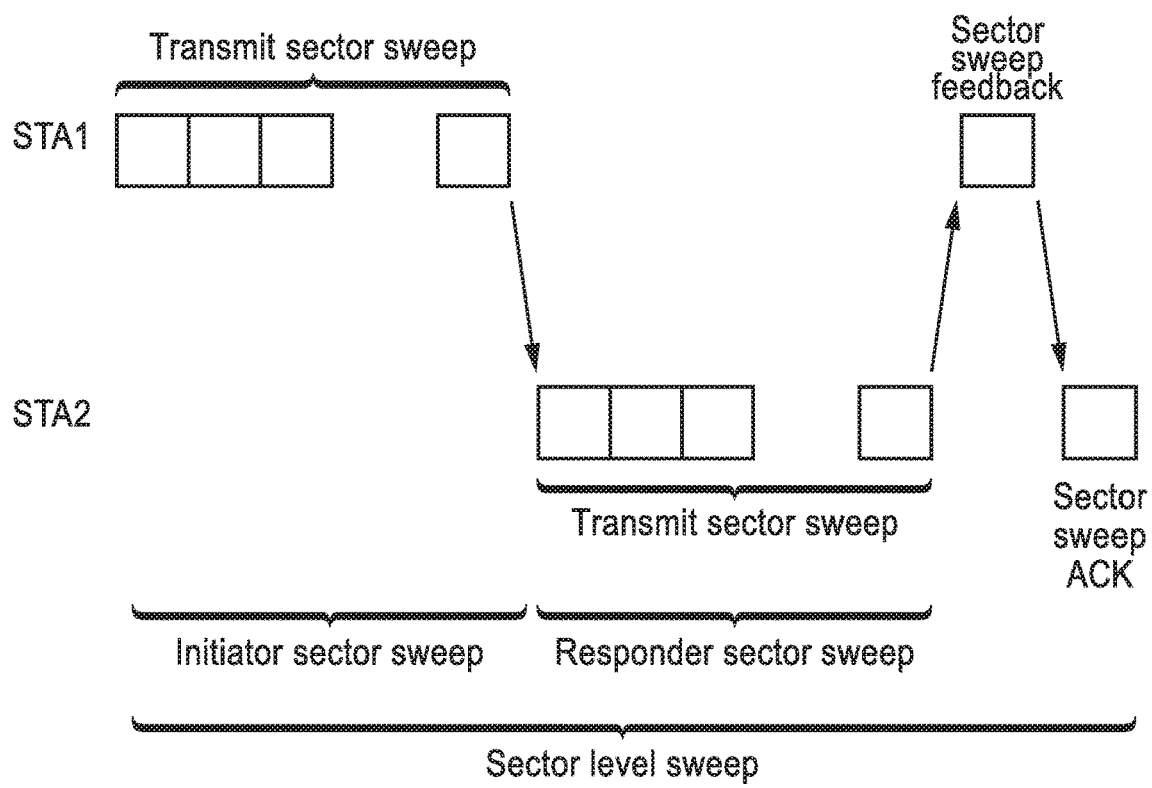
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

3. Station (STA) Hardware Configuration

Figure 10:
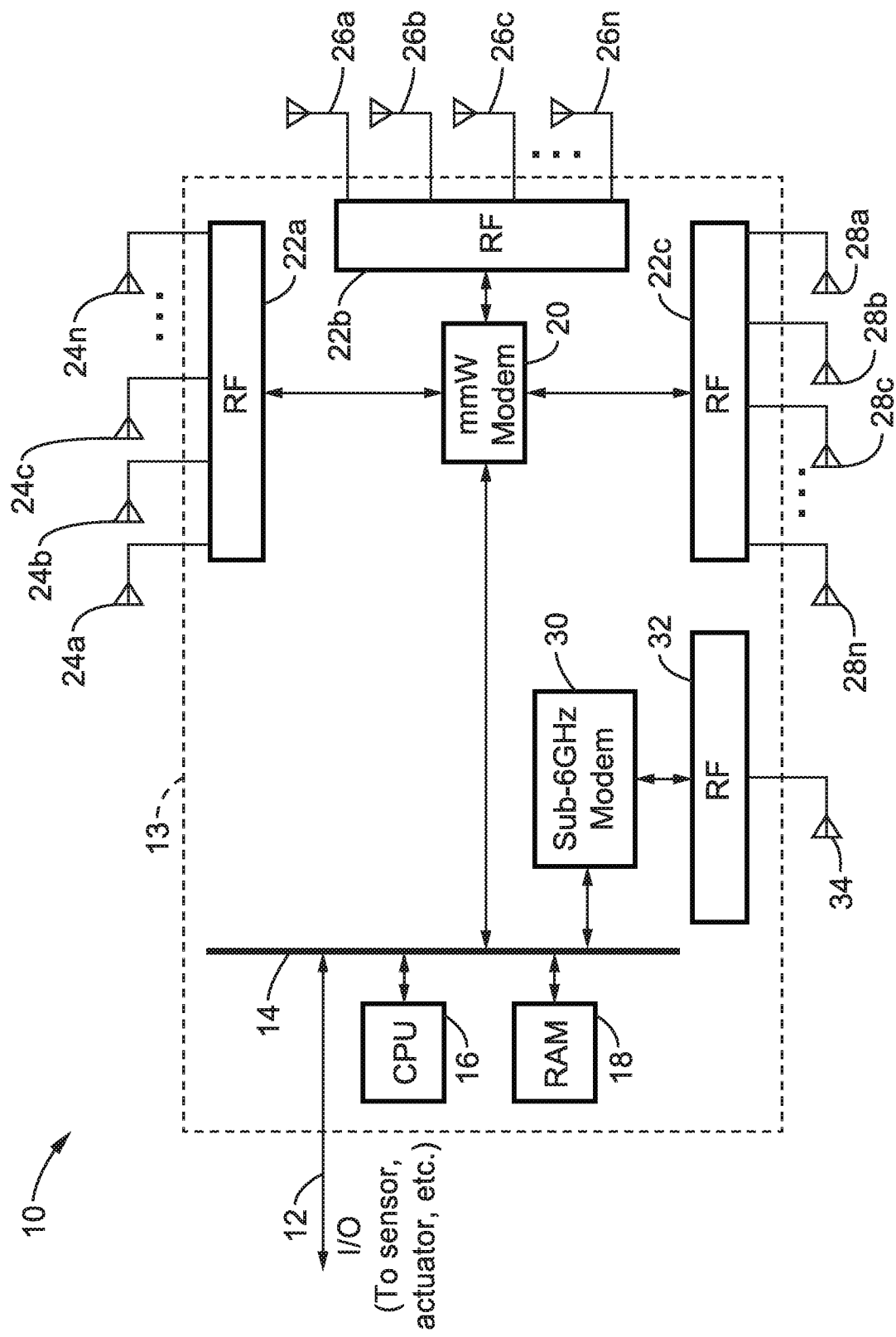
FIG. 10 is a block diagram of a WLAN communications station hardware as utilized according to an embodiment of the present disclosure.

FIG. 10 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 11:
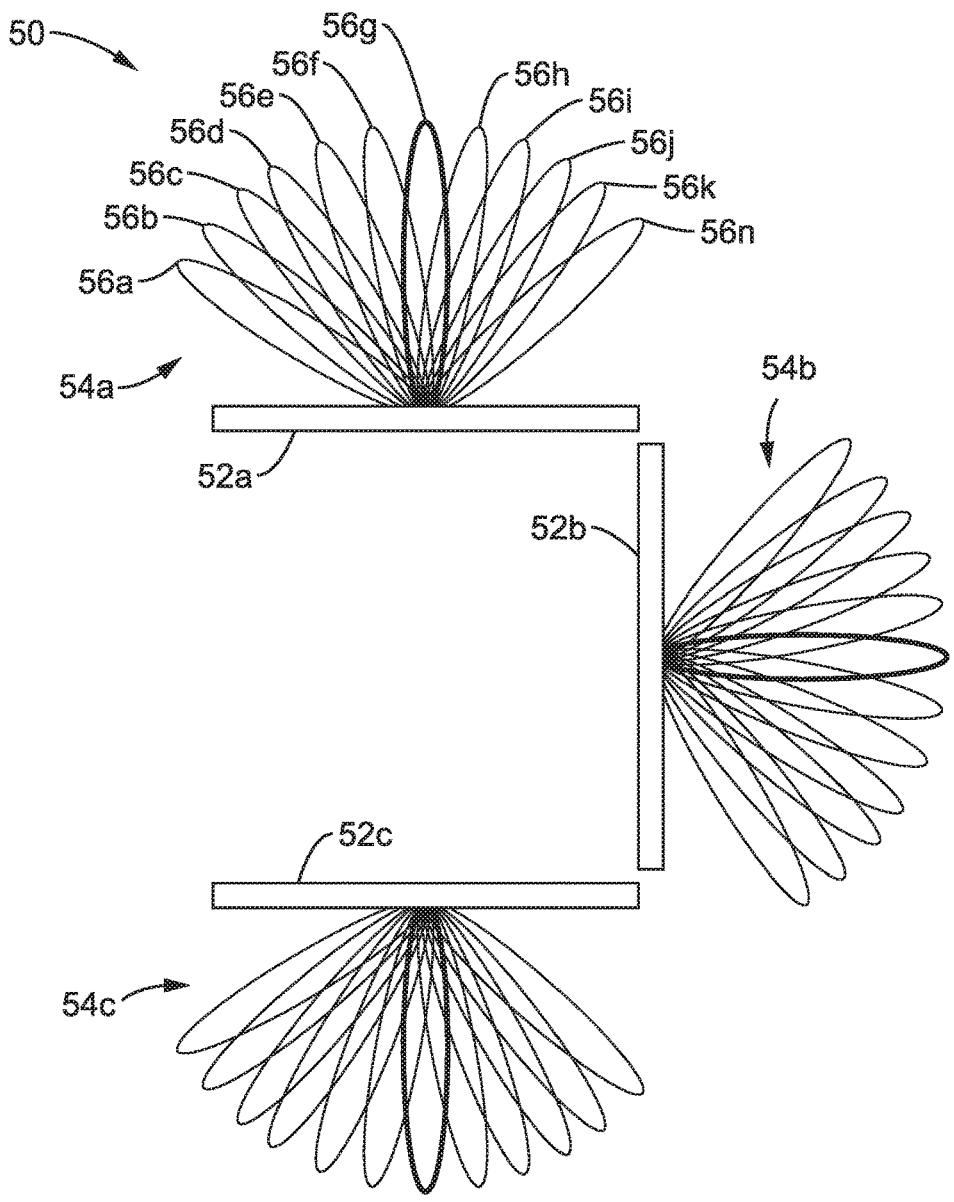
FIG. 11 is a mmW beam pattern diagram for the station hardware of FIG. 10 as utilized according to an embodiment of the present disclosure.

FIG. 11 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c, Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuity and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
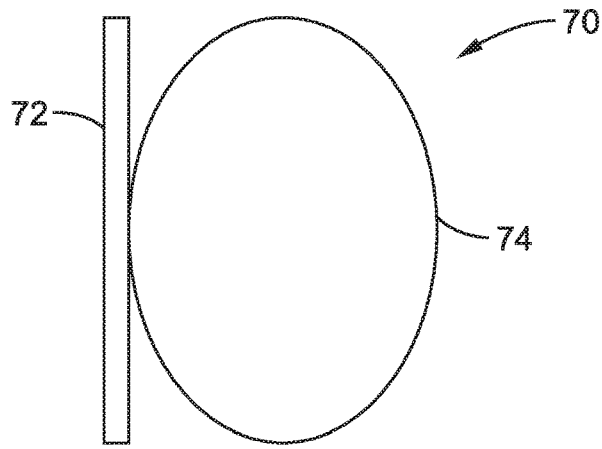
FIG. 12 is a beam pattern diagram for a discovery band communications Omni-antenna, or Quasi-Omni-antenna, (i.e., sub-6 GHz), according to an embodiment of the present disclosure.

FIG. 12 illustrates an example embodiment 70 of antenna pattern for the sub-6 GHz modem assumed to use a Quasi-Omni antenna 74 attached to its RF circuitry 72, although other circuitry and/or antennas may be utilized without limitation. It should be appreciated that the present disclosure can support stations using Quasi-Omni-directional and/or Omni-directional communications, wherein reference to one of these types in the specification generally implies the other as well.

4. Distributed Scheduling Protocol

The following protocols describe stations operating in a WLAN configured according to the present disclosure to perform distributed scheduling. In at least one embodiment, an EDMG PCP or AP uses the distributed scheduling protocol to improve spectrum sharing and interference mitigation with other BSSs that also utilize the disclosed distributed scheduling protocol. An EDMG PCP or AP enable the distributed scheduling protocol and advertise it by setting the Distributed Scheduling Enabled subfield to active (e.g., 1) in a transmitted EDMG Extended Schedule element. An EDMG PCP or AP that operates distributed scheduling starts by listening for a maximum permitted beacon interval duration for other STAs DMG beacons. The EDMG PCP or AP determine the time, channel and periodicity of the other STAs beacon frame transmissions if these STAs are also using the distributed scheduling protocol.

A distributed enabled EDMG PCP or AP listens for DMG beacons from neighbors on different channels from which it can determine their upcoming transmission schedules by parsing the Extended Schedule element and the EDMG extended schedule element. Once the EDMG PCP or AP determines how many neighbors occupy each channel, then restricts itself to only accessing a period of the beacon interval equal to the beacon interval divided by the number of detected neighbors occupying the channel. This usage includes the BTI and the scheduled SPs but does not include the CBAP since it is not a guaranteed access to the channel. The EDMG PCP or AP first randomly schedules its SPs over an unoccupied time period. If no more unoccupied time periods remain and the EDMG PCP or AP has not yet utilized its share of the channel, it may schedule randomly over time periods with no neighbor SPs. If no more unoccupied time periods remain and the EDMG PCP or AP has not yet utilized its share of the channel, then it may schedule randomly over time periods when there are no SPs of distributed scheduling enabled PCPs or APs.

Figure 13:
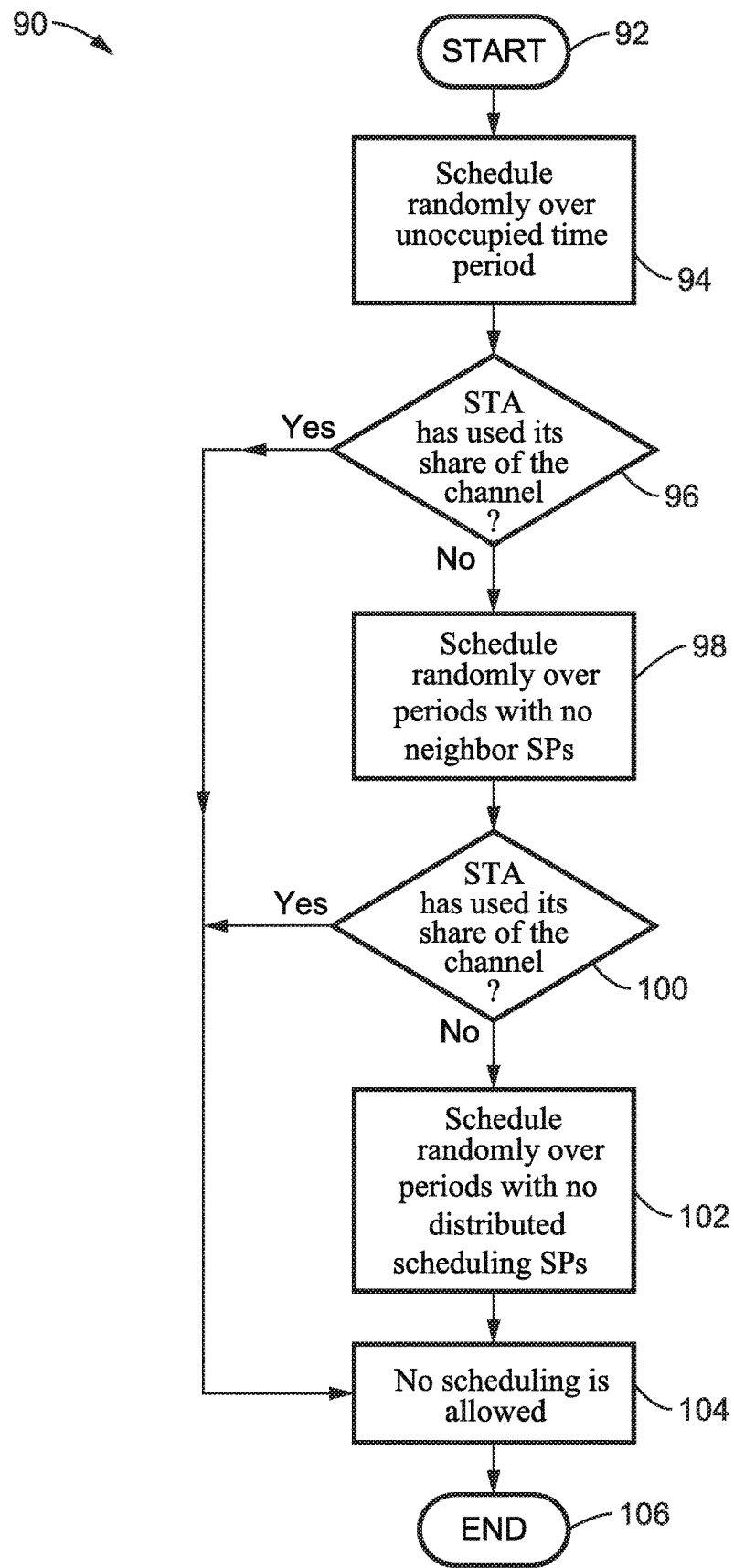
FIG. 13 is a flow diagram of distributed scheduling by an AP or PCP and scheduling with other stations according to an embodiment of the present disclosure.

FIG. 13 illustrates an example embodiment 90 of an AP or PCP deploying the distributed schedule protocol and scheduling other STAs with the knowledge it has about the other PCP or AP enabling and not enabling the distributed scheduling protocol. The process starts 92 and scheduling is performed 94 randomly over the unoccupied (available) time period. A check is made 96 to determine if the station has utilized its share of the channel. If the station has already used its allotment of channel time then block 104 is reached and no more scheduling is allowed with the process ending 106.

Otherwise, if block 96 determines the station has not used its share of the channel, then at block 98 scheduling is performed randomly over a period in which there are no neighboring service periods (SPs). Another check is made at block 100 to again determine if the station has used its share of the channel. If it has, then again execution moves to block 104 and ends at block 106. Otherwise, if the station has not used its allotment, then at block 102 scheduling is performed randomly across the available periods with no distributed scheduling SPs, before stopping any further scheduling 104 and ending the process 106.

5. Directionality and Distributed Scheduling Protocol

The previously described distributed scheduling protocol does not take into account the directionality of channel access. When a channel is allocated to other STAs, the transmission or reception might be in a direction other that the direction where the channel access is required. With a proper knowledge of the spatial direction of the channel use, the channel can be reused on multiple spatial directions. Thus, according to the present disclosure the EDMG PCP or AP collects information about its neighbors, their upcoming transmission schedules, and directions of transmissions. The information of the directionality of each neighbor channel access can be used in a number of ways, such as to schedule other transmissions in directions that are non-interfering, or interfered with, by upcoming scheduled transmissions.

Figure 14:
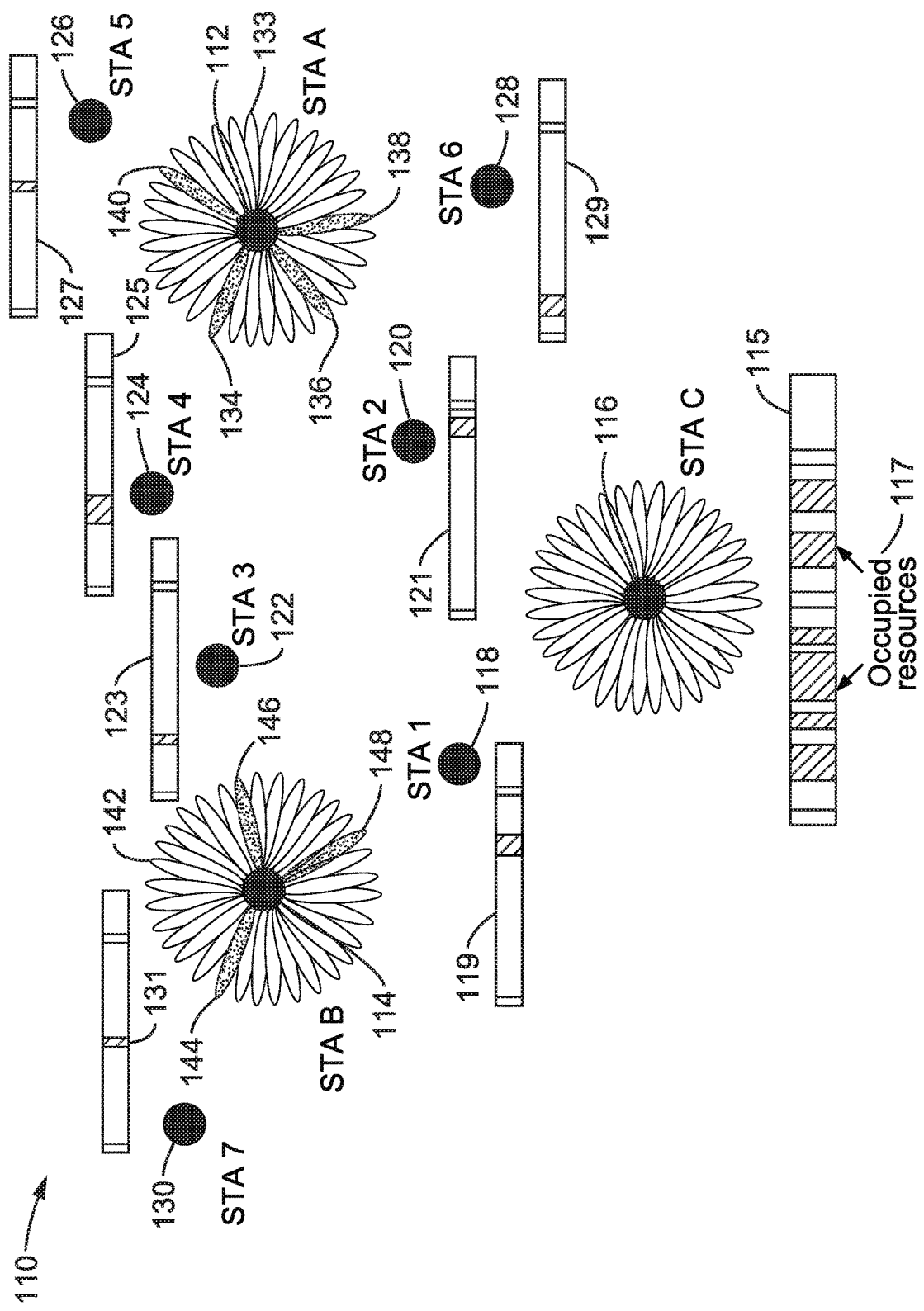
FIG. 14 is a signaling and directional beam diagram showing an example of parsing allocation information by neighboring stations according to an embodiment of the present disclosure.

FIG. 14 illustrates an example 110 of parsing allocation information by neighboring stations STA A 112, STA B 114, STA C 116, STA 1 118, STA 2 120, STA 3 122, STA 4 124, STA 5 126, STA 6 128 and STA 7 130. In this example STA C 116 is scanning and listening for DMG beacons from other STAs in the area (STA A and STA B). It is seen that STA A 112 has sectors 133 and is communicating over sectors 134, 136, 138 and 140 to nearby stations. STA B 114 has sectors 142 and is communicating over sectors 144, 146 and 148.

STA C according to the pre-defined distributed scheduling protocol parses the allocation information in the received beacon from STA A and STA B which is shown as an allocation map 115 and finds out all the occupied resources 117 in the channel. According to the flow chart as was described in FIG. 13, STA C allocates transmission in the unoccupied resources as described above.

In FIG. 14 one sees channel diagrams 119, 121, 123, 125, 127, 129 and 131 for each of the stations STA 1 through STA 7. From the figure it is noted that there are transmissions that are not impacting STA C, due to their direction, and still STA C is marking these allocations 115 as blocked resources 117. The present disclosure allows STA C to differentiate which allocations in each of the received beacons are a relevant threat to its transmissions and which are not.

Figure 15:
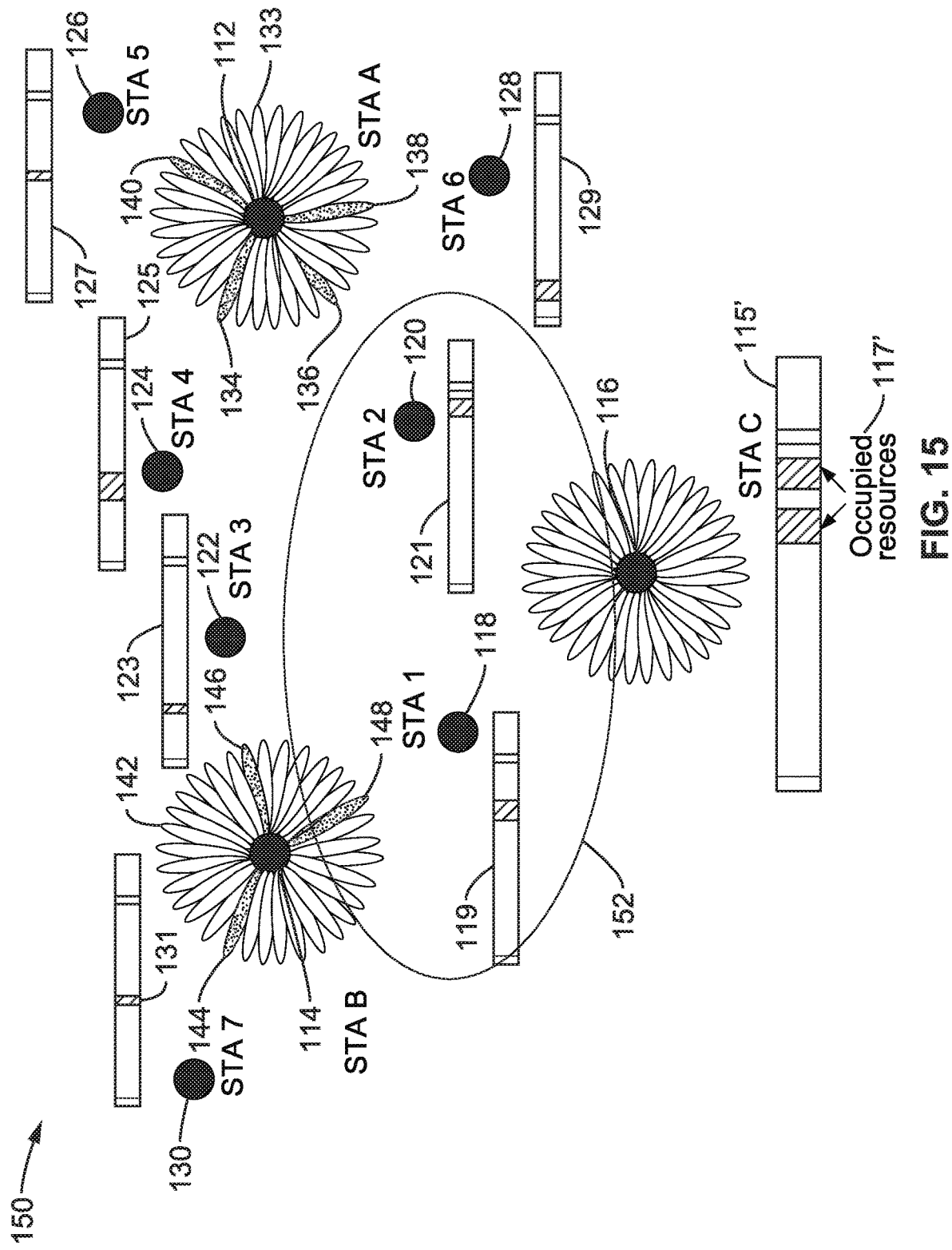
FIG. 15 is a signaling and directional beam diagram showing an example of considering allocations only in its directions of interest according to an embodiment of the present disclosure.

FIG. 15 illustrates an example embodiment 150 in which the protocol is configured for only considering allocation in its specific directions of interest. The stations and allocations depicted are the same as was shown in FIG. 14. STA A 112 and STA B 114 transmissions toward the STAs in the circle 152 represent the only allocations that can affect STA C transmissions. Thus, according to the present disclosure STA C only considers these allocations 115' as occupied time 117' when it is considering time allocated to other STAs.

Figure 16:
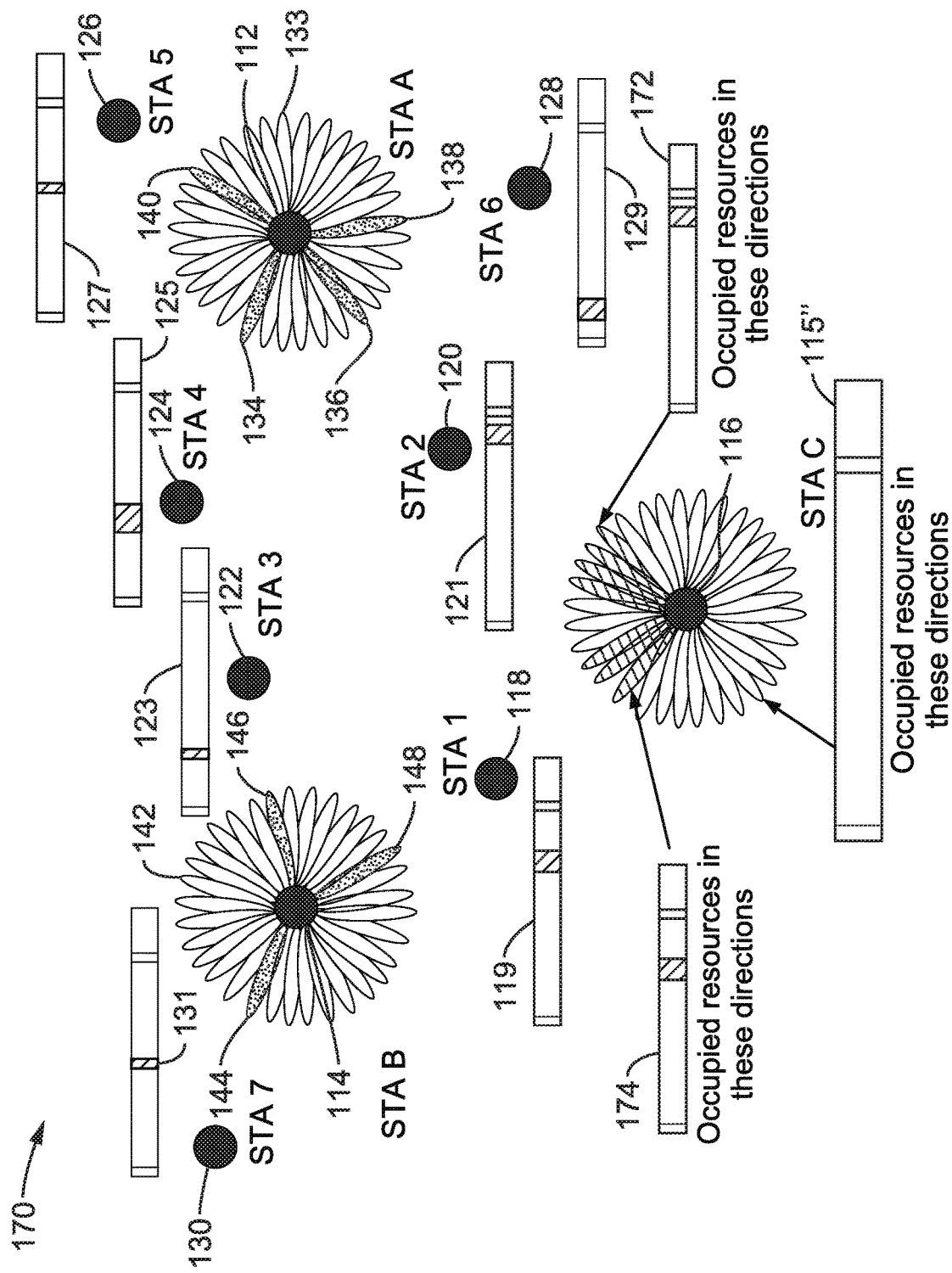
FIG. 16 is a signaling and directional beam diagram showing an example of allocation discernment according to an embodiment of the present disclosure.

FIG. 16 illustrates an example embodiment 170 in which further allocation discernment is performed. The stations and their general communication sectors are the same as was shown in previous FIG. 14 and FIG. 15. It is seen in FIG. 16, that although only STA 1 and STA 2 allocation are in the direction of STA C (as was indicating in FIG. 15), that these allocations are not affecting all directions of STA C equally. In fact, as shown in FIG. 16, the allocation of STA 2 172 may only affect some of the directions in STA C, marked with cross-hatched sectors) and not all other directions. The same is true for STA 1 allocations 174, which may only be heard by the directions of STA toward STA 2 only. The rest of the sector directions of the station, not shown with cross-hatching, are not affected since they could not receive or cause interference with respect to allocations 115".

5.1. Determining Upcoming Tx in Direction of the STA

A STA deploying the disclosed distributed scheduling protocol listens for a maximum permitted beacon interval duration for other STAs DMG beacons. The received beacons contain the upcoming transmission schedules of these station within the Extended Schedule element and the EDMG extended schedule element. It should be appreciated that the EDMG extended scheduling element has more scheduling capabilities and information than the extended schedule element. For example the EDMG extended scheduling element allows for allocation of variable BW and channel aggregation. The EDMG extended scheduling element can be sent as a supplement to the extended schedule element or sent stand alone. Not all the allocations in the Extended Schedule element or the EDMG extended schedule element affect the STA receiving the beacon. If the allocation is scheduled in a direction toward the STA, this allocation should be considered. If the allocation is scheduled in a direction not toward the STA receiving the beacon, then this allocation should not be considered. In at least one embodiment, the scheduling information contains information about the sector direction where it is coming from so that the receiving STA can determine whether this allocation will affect its scheduling or not. Each allocation contains the beam ID and antenna ID of the sector it is scheduled to be transmitted from. The STA may use this information to determine the whether the allocation is affecting it or not.

5.1.1. EDMG Extended Schedule Element and Directional Info

FIG. 17 through FIG. 19 illustrate an example embodiment 190, 200, 210 of an EDMG Extended Schedule element. The EDMG Extended Schedule element defines channel scheduling for an EDMG BSS, including indication of which channels an allocation is scheduled on. In FIG. 17 depicted the EDMG extended schedule element format with the following fields. The element ID, Length and Element ID extension indicate the type of element and length of the element. The EDMG Allocation Control field contains control bits for the EDMG allocation process. The Number of Allocations field indicates the number of allocations in the element. A number of channel allocation fields, Channel Allocation 1 through Channel Allocation N, are described below.

In FIG. 18 is seen the subfields within each Channel Allocation field. If the Scheduling type is 1 it indicates that the channel allocation field contains the complete allocation information, otherwise it only contains supplemental information. The channel aggregation and BW subfields define the bandwidth (BW) that the allocation is using. The Asymmetric Beamforming, NSTS and Nmax STS subfields are used to configure Asymmetric beamform training allocation if the Asymmetric Beamforming subfield is 1. The receive and transmit direction subfields are described below.

In FIG. 19 is seen the bits within the receive/transmit subfields. The Receive Direction and Transmit Direction subfields indicate the receive antenna and the transmit antenna configuration that the PCP or AP uses during the allocation. The IsDirectional subfield is set to 1 to indicate that the PCP or AP uses a directional, non-quasi-Omni antenna pattern to receive frames when it is receiving or to transmit frames when it is transmitting during the allocation, and is set to 0 otherwise. The Sector ID subfield is reserved if the IsDirectional subfield is 0. Otherwise, the Sector ID subfield indicates the sector that the AP or PCP uses to receive frames when it is receiving or to transmit frames when it is transmitting during this allocation. The DMG Antenna ID subfield is reserved if the IsDirectional subfield is 0. Otherwise, the DMG Antenna ID subfield indicates the DMG antenna that the AP or PCP uses to receive frames when it is receiving or transmitting frames, when it is transmitting during this allocation. The Receive Direction and transmit Direction subfields are reserved if the Asymmetric Beamforming Training subfield is one.

5.1.2. Beacon Scheduling Info Affecting Future Transmissions

Each DMG beacon transmitted from a STA contains scheduling information as the scheduling element is added to the transmitted beacon. The scheduling element, EDMG extended schedule element, contains information about the transmit antenna directionality for each allocation which enables the distributed scheduling.

Figure 20:
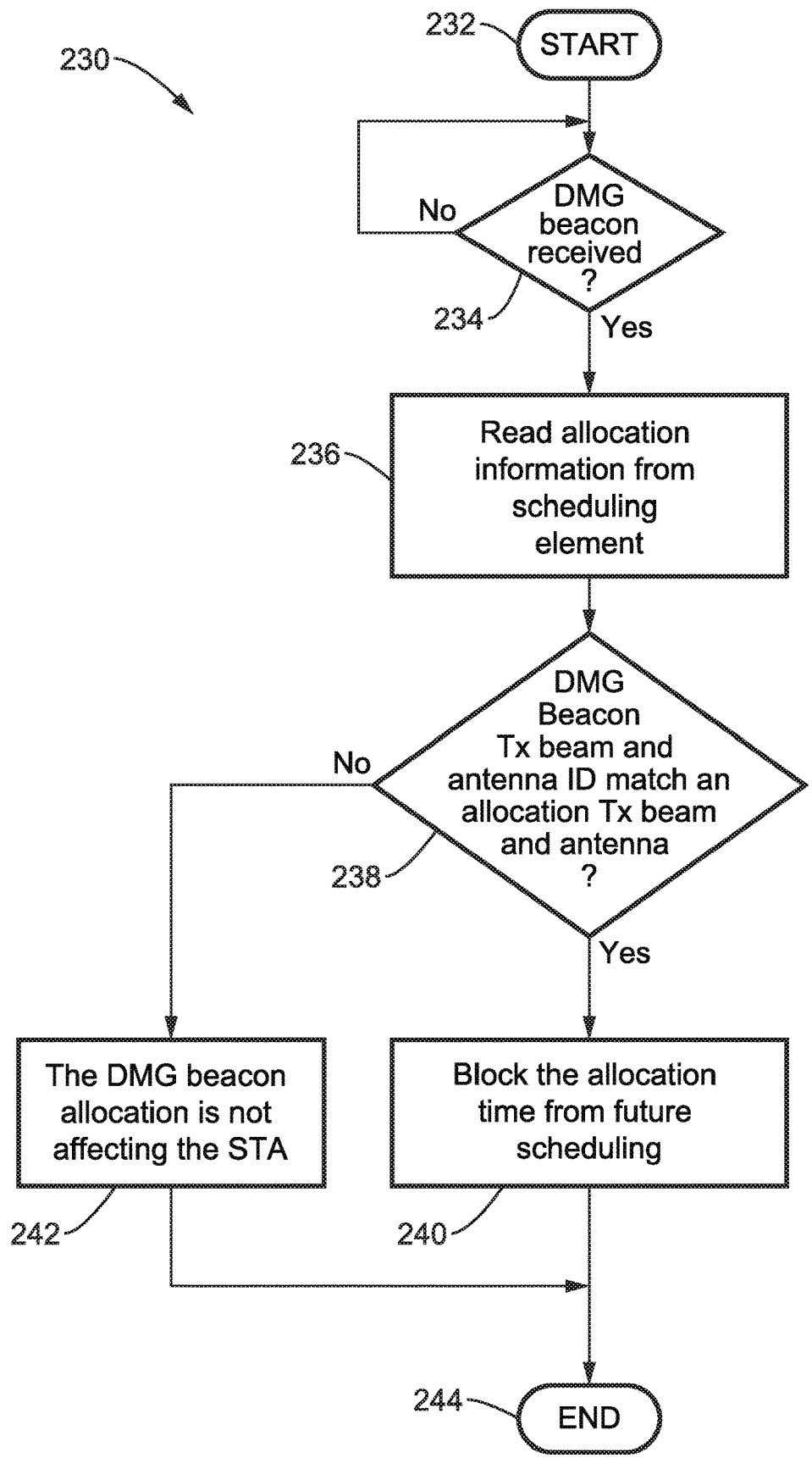
FIG. 20 is a flow diagram of a station receiving and parsing scheduled allocations from a beacon according to an embodiment of the present disclosure.

FIG. 20 illustrates an example embodiment 230 of a STA receiving the DMG beacon and parsing its scheduled allocations to determine allocation information. If there is at least one allocation in the scheduling element where the Transmit antenna and beam ID of the allocation matches the transmit antenna and beam ID of the received beacon, the STA will consider these allocations while scheduling future transmission. If the transmit antenna and beam ID of the allocation does not match the transmit antenna and beam ID of the received beacon, then the allocation is not affecting the STA since it is transmitting in a direction that is not receivable by the STA. The STA marks this allocation time to be blocked during future scheduling of transmission.

The process commences 232 checking 234 for a received DMG beacon. When a DMG beacon is received, block 236 reads allocation information from the scheduling element, then a check 238 determines if the DMG beacon Tx beam and the antenna ID match an allocation Tx beam and its antenna. If there is no match, then at block 242 the DMG beacon allocation does not impact the STA so no interference allocation is performed and the process ends 244. Otherwise, if a match is found at block 238, then block 240 is reached which blocks the allocation time from future scheduling and the process ends 244.

5.2. Knowing Directionality of Neighbor Upcoming Transmissions

Figure 21A:
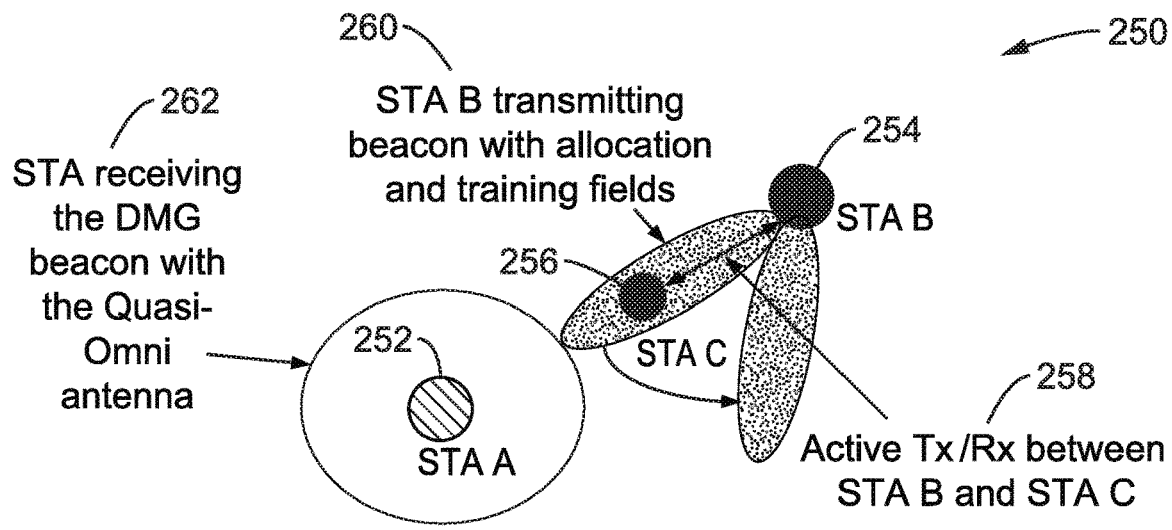
FIG. 21A through FIG. 21C is a signaling and directional beam diagram showing communicating directionality information between stations on the network according to an embodiment of the present disclosure.
Figure 21B:
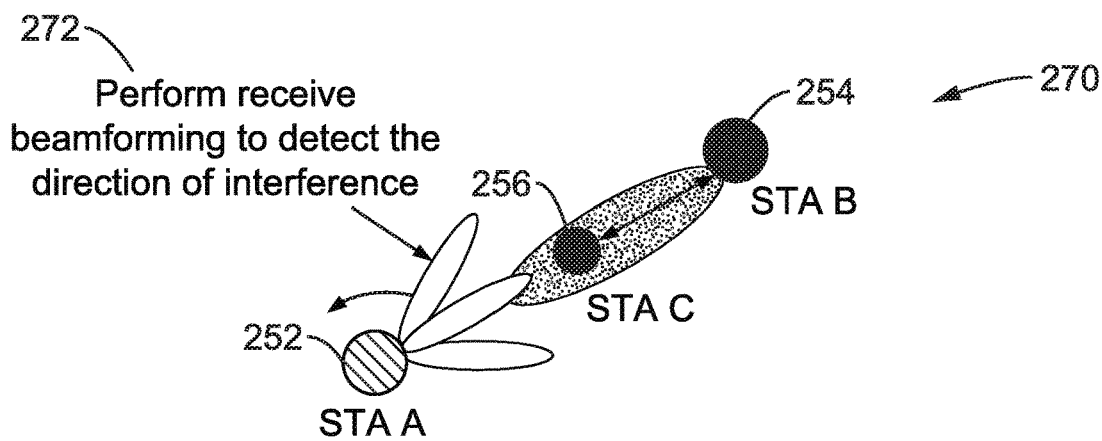
Figure 21C:
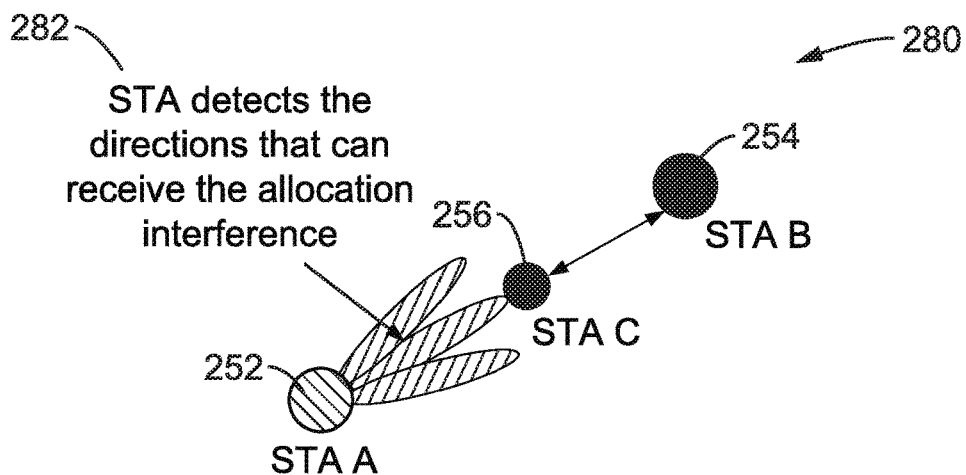

FIG. 21A through FIG. 21C illustrate an example embodiment 250, 270, 280, illustrating communicating directionality information between stations on the network. A network is shown having STA A 252, STA B 254 and STA C 256. In this example, there is an active Tx/Rx 258 between STA B and STA C.

In FIG. 21A STA B 254 is transmitting 260 a beacon containing allocation and training fields which is received 262 by STA A 252 using a Quasi-Omni antenna. Each DMG beacon transmitted from a STA enabling the distributed scheduling protocol may contain training fields associated with the transmitted DMG beacon. The DMG beacons are transmitted at least in the direction of the allocation and can be broadcasted in all directions. The DMG beacon contains the allocation information and the Tx directionality of each allocation. The receiving STA can determine if the received beacon is transmitted from the same direction where the future allocation is transmitted from.

If the DMG beacon Tx beam and antenna ID matches one of the allocations in the extended schedule element or the EDMG extended schedule element, the STA receiving the DMG Beacon uses the training fields associated with the DMG beacon to train 272 its receive antennas as seen in FIG. 21B.

In FIG. 21C the STA marks 282 the directions where the DMG can be received, if the received power is above a threshold. The directions marked could be affected by this other STA and the allocations in the DMG beacon are marked according to these directions.

Figure 22:
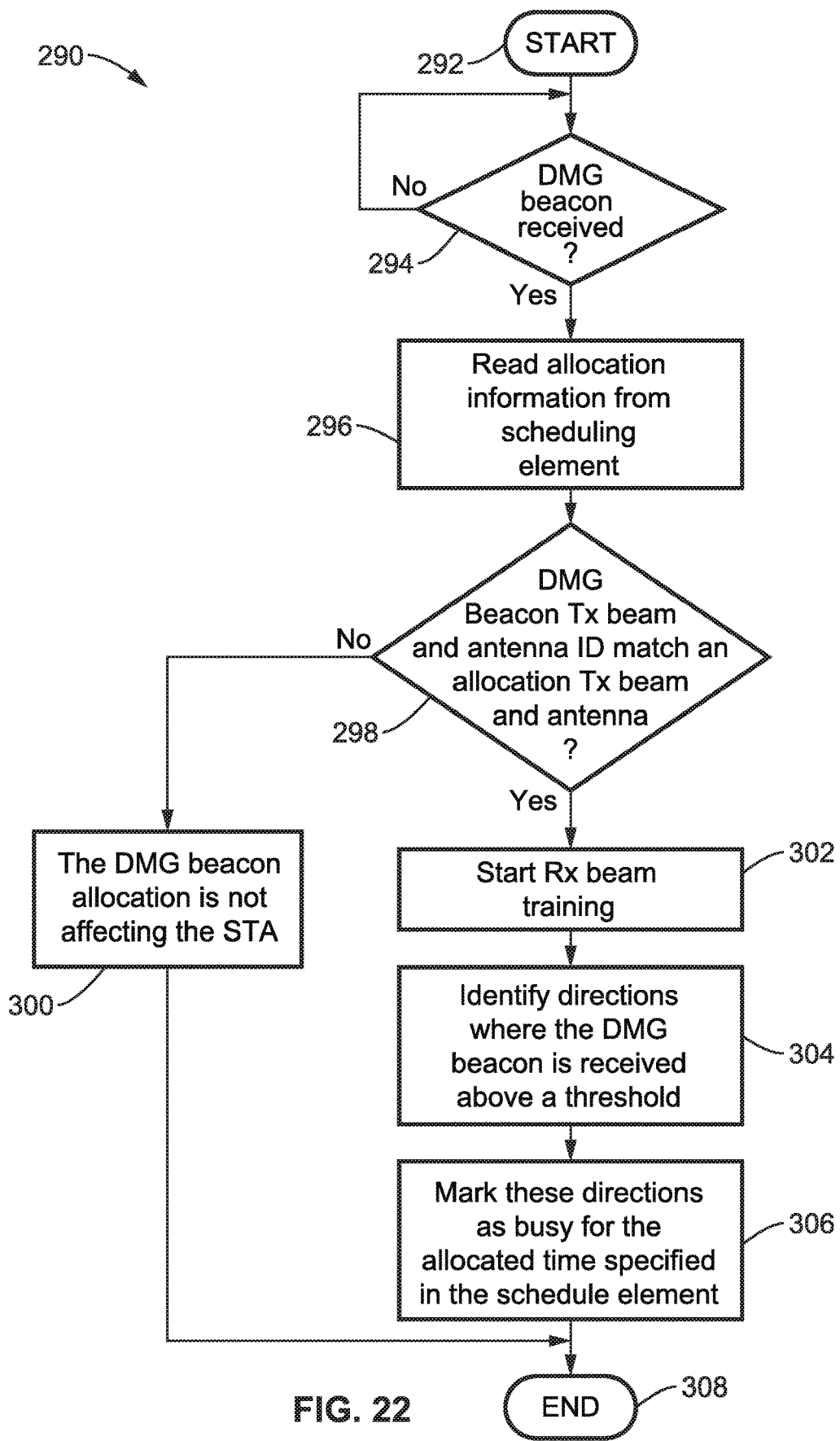
FIG. 22 is a flow diagram of a STA receiving a DMG beacon and extracting the directional and allocation information from it according to an embodiment of the present disclosure.

FIG. 22 illustrates an example embodiment 290 of a STA receiving a DMG beacon and extracting the directional and allocation information from it. After processing the flow chart, the STA determines directions, if any, that are affected by scheduled allocations from the received DMG beacon. If the allocation is not in the direction of the received beacon, the STA does not mark any direction as busy.

In particular, the process starts 292 and upon receiving a DMG beacon 294 reaches block 296 which reads allocation information from the scheduling element. A check is performed 298 if the DMG beacon Tx beam and antenna ID match an allocation Tx beam and antenna. If there is no match then at block 300 the DMG beacon allocation does not impact the STA, so no interference allocations are necessary and the process ends 308. Otherwise, if block 298 indicates a match, then at block 302 Rx beam training begins, then at block 304 directions are identified where the DMG beacon is received above a threshold, and these directions are marked 306 as busy for the allocated time specified in the schedule element before ending 308 the process.

6. Distributed Scheduling Protocol with Directional Info

In this section two examples are provided of distributed scheduling protocols. These are considered as examples, and it should be appreciated that the order over which the rules of scheduling the SP can be changed, such as depending on the application of the scheduler, without departing from the present disclosure. The two examples presented allocate the resources to the users in one case where the users get the best resources first, as in protocol 1, and reusing the channel first in time and space before using unoccupied resources, as in protocol 2. It should be appreciated that other example embodiments can be implemented using the same general rules while changing the order of applying them.

6.1. Protocol 1: Schedule Unoccupied Period First

The channel, when it is not used in time and space by any other STA, is considered an unused channel (unoccupied time period). In this example the STA schedules the best resources first from the unused channels and unoccupied time periods, and if more scheduling is needed the channel is reused where time allocations and sector directions are not overlapping with other scheduled transmissions. This approach can be considered a 'selfish' approach in that the STA schedules the best resources to itself first.

Figure 23A:
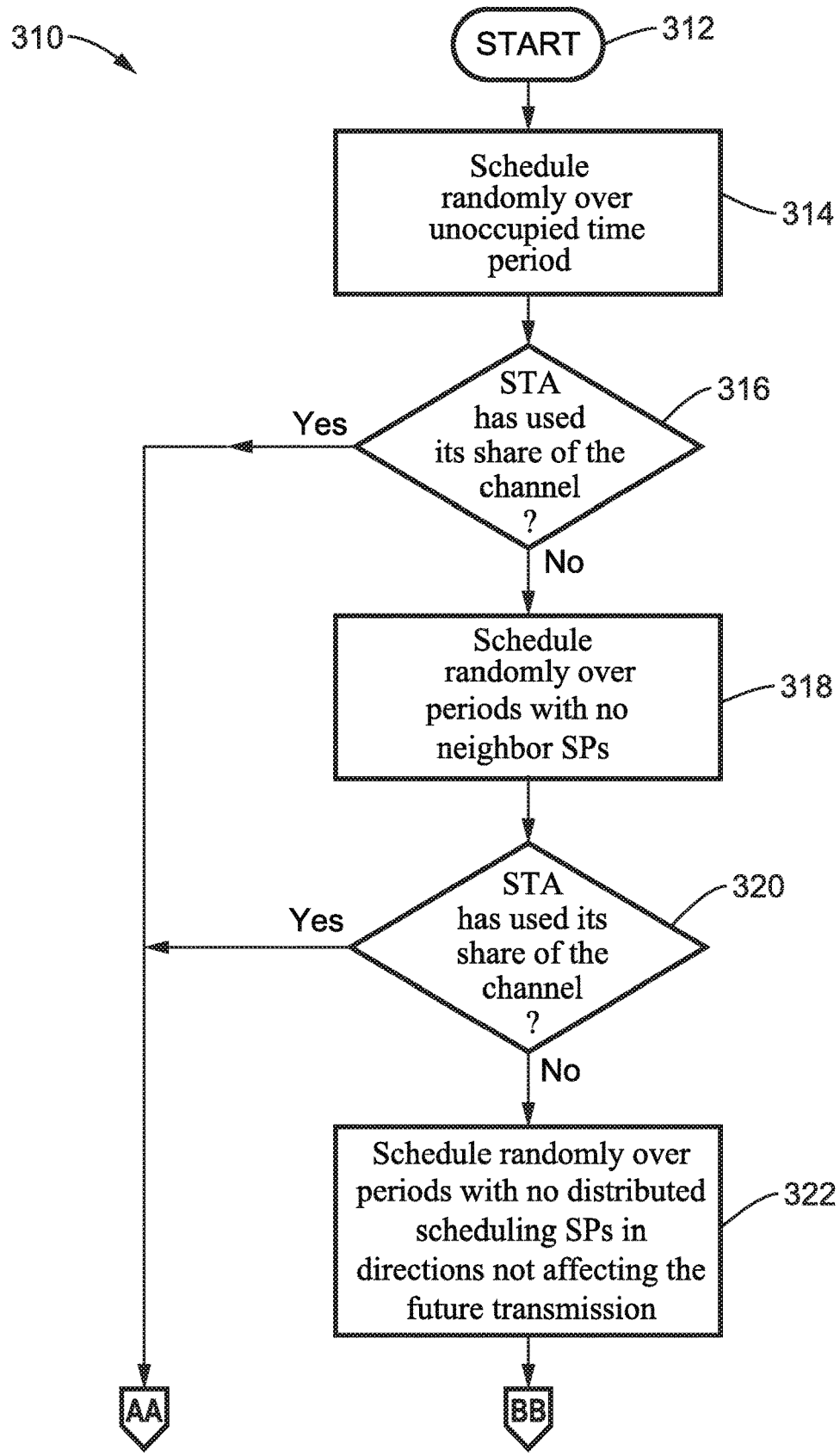
FIG. 23A and FIG. 23B is a flow diagram of a first protocol which schedules unoccupied periods first according to an embodiment of the present disclosure.
Figure 23B:
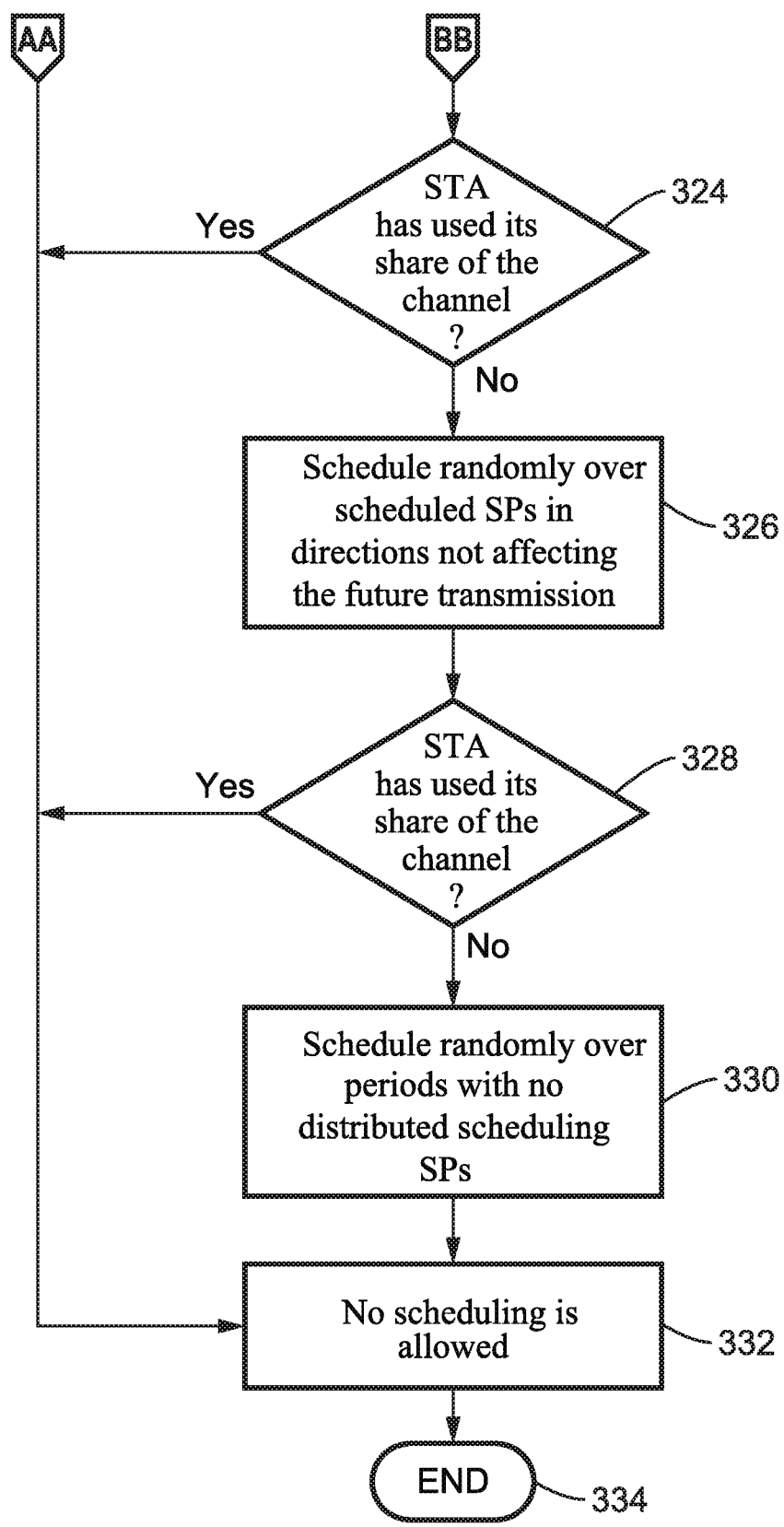

FIG. 23A and FIG. 23B illustrate an example embodiment 310 of this first protocol example of distributed scheduling. The process starts 312 in FIG. 23A and the STA first randomly schedules 314 the unoccupied periods in time and space. The flow of this is shown performing scheduling and then checking if the STA still has used its share of the channel. If it has used its share of the channel, then block 332 in FIG. 23B is reached and no more scheduling is allowed and the process ends 334.

Block 318 in FIG. 23A is reached when the STA has not used all of its share of the channel, so it now schedules randomly over periods with no neighbor SPs. After all of them are scheduled, a check is performed 320 to determine if the STA has used its share of the channel. If it has used its share then execution moves to block 332 in FIG. 23B as previously described. Otherwise, block 322 is reached and performs scheduling randomly over period with no distributed scheduling SPs, followed by another check 324 in FIG. 23B if the STA has used its share of the channel, wherein execution would move to block 332. Otherwise, block 326 is reached which schedules randomly over scheduled SPs in directions not affecting future transmission. Check 328 moves execution to block 332 if the STA already is using its full share. Otherwise, at block 330 the STA randomly schedules over periods of time with no distributed scheduling SPs, and reaches block 332 which ends 334 the process.

6.2. Protocol 2: Schedule Unused Dirs of Occupied Periods First

Whenever there is an opportunity to reuse the channel in a direction that is not affecting the current scheduled transmission, it is scheduled first. In some instances this paradigm of channel reuse is favored over using the channel when no one else is accessing it, so as to guarantee that other STAs can use the channel in times when no one is using it and it is guaranteed that it is free for everyone. The objective of this protocol is to make sure that free time periods will be left out when possible to other STAs to schedule their transmission.

Figure 24A:
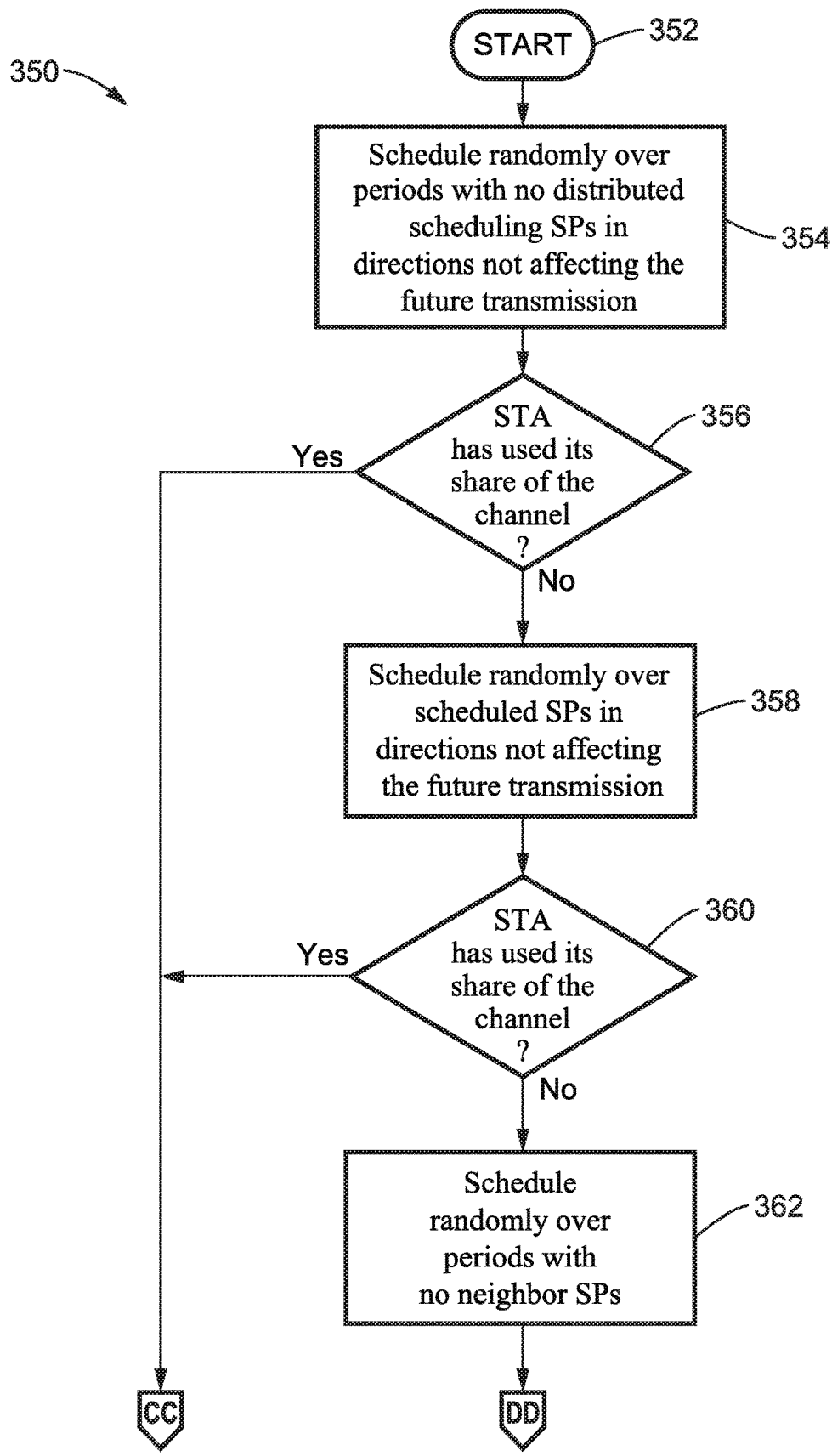
FIG. 24A and FIG. 24B is a flow diagram of a second protocol which first reuses the channel in a direction which does affect current scheduling according to an embodiment of the present disclosure.
Figure 24B:
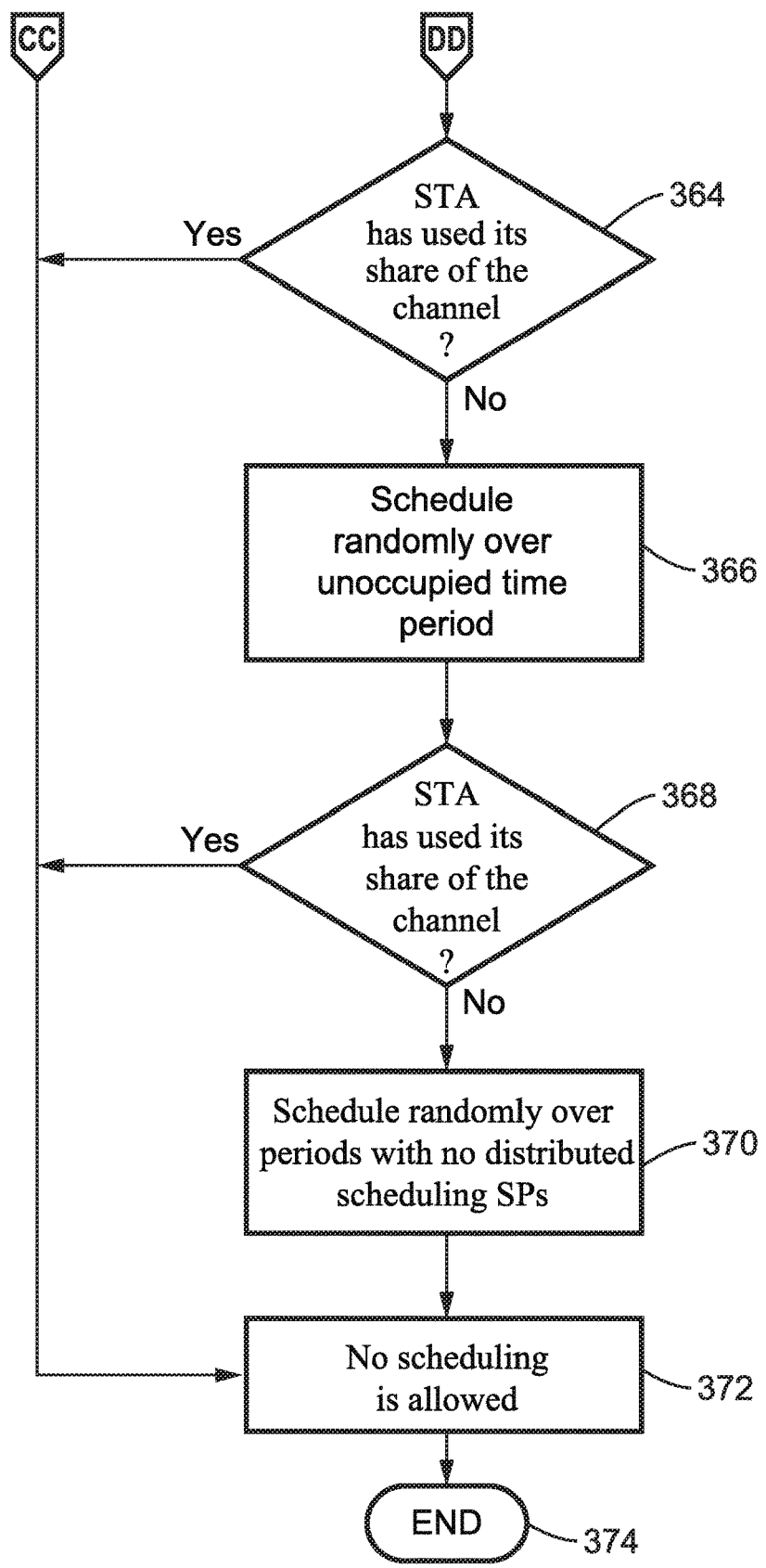

FIG. 24A and FIG. 24B illustrate an example embodiment 350 of this second protocol example of distributed scheduling. The process starts 352 in FIG. 24A and the STA first randomly schedules 354 over periods of time that are occupied by STAs not enabling distributed scheduling and in directions that are not affecting its transmission. After all of them are scheduled, a check is made at block 356 and execution moves to block 372 in FIG. 24B if the STA has used its share of the channel. Otherwise block 358 is reached where the STA randomly schedules over periods of time that are occupied by STAs enabling distributed scheduling and in directions that are not affecting its transmission. After all of them are scheduled, a check is made at block 360 and execution moves to block 372 in FIG. 24B if the STA has used its share of the channel. Otherwise block 362 is reached and the STA randomly schedules over periods with no neighbor SPs. After all of them are scheduled, a check is made at block 364 of FIG. 24B and execution moves to block 372 if the STA has used its share of the channel. Otherwise, the STA randomly schedules 366 over the unoccupied period in time and space. After all of them are scheduled, a check is made at block 368 and execution moves to block 372 if the STA has used its share of the channel. Otherwise block 370 is reached and the STA randomly schedules over periods of time that are occupied by the STA not enabling distributed scheduling SPs. After this scheduling is concluded 372 and the process ends 374.

7. Summary of Disclosure Elements

The following summary discloses certain important elements of the instant disclosure, however the summary is not to be construed as describing the only important elements of the disclosure.

According to the disclosed protocol, method and/or apparatus, a STA running the distributed schedule protocol is aware of the directionality of transmission of other STAs running distributed scheduling protocol and schedules its transmission in time (e.g., percentage of channel) and directions (e.g., sectors of directional antenna) that is not affected by the already scheduled transmission by other STAs.

A distributed scheduling protocol is configured to allow distributing the unoccupied channel resources (time and space) first and then consider reusing the occupied period of time in time and directions that is not affecting the future scheduled transmission A distributed scheduling protocol is configured for reusing the occupied period of time in directions that are not affecting future scheduled transmissions, before using the unoccupied resources in time and space.

A STA operating the disclosed distributed scheduling protocol sends a DMG beacon with scheduling information including the TX directivity information (Beam ID and antenna ID) of each allocation) and training fields attached to the beacon at least in the direction of scheduled transmission and reception.

A STA operating the distributed scheduling protocol listens for DMG beacon from other STAs running, or not running, the distributed scheduling protocol.

A STA operating the distributed scheduling protocol parses allocation information contained in a received beacon, from another STA operating under the distributed scheduling protocol, and extracts the following information. (1) If the allocation is scheduled in the same direction of the received DMG Beacon, this allocation time should be avoided when the STA is scheduling future allocation to avoid interfering this transmission. The STA receiving the DMG beacon compares the TX directivity information of the allocation with the DMG Beacon TX beam and antenna ID information to determine if the allocation is in the direction of the received beacon. (2) If the allocation is in the direction of the received DMG Beacon, the STA receiving the DMG Beacon determines the directions that are affected by this allocation by performing Rx beam training and finding the directions where the received power is above some threshold or is considered interference to these directions. These directions should be avoided at the allocation time when the STA which received the DMG beacon is scheduling future transmission in the same time where the STA sending the DMG beacon has scheduled allocation.

8. General Scope of Embodiments

The enhancements described in the presented technology can be readily implemented within the protocols (e.g., programming executing on the processor of the station) of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), form ula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

The apparatus or method of any preceding or following embodiment,

1. An apparatus for wireless communication in a network, comprising: (a) a wireless communication circuit configured as a station for wirelessly communicating with at least one other station, using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) performing directional communications with another station over a directional antenna sectors selected from a plurality of antenna direction sectors; and (d)(ii) performing a distributed scheduling protocol comprising: (d)(ii)(A) transmitting directional transmission information containing sector directions and channel use time within beacons or messages being sent; (d)(ii)(B) receiving and processing directional transmission information from other stations; and (d)(ii)(C) allocating channels and scheduling future transmissions based on the processed directional transmission information containing sector directions and channel use time from neighboring stations.

2. A method of performing wireless communication in a network, comprising: (a) performing directional communications, by a wireless communication circuit configured as a station on a wireless network configured for wirelessly communicating with at least one other station using directional communications over a directional antenna sectors selected from a plurality of antenna direction sectors; (b) performing a distributed scheduling protocol comprising (b)(i) transmitting directional transmission information containing sector directions and channel use time within beacons or messages being sent; and (b)(ii) receiving and processing directional transmission information from other stations; (b)(iii) allocating channels and scheduling future transmissions based on the processed directional transmission information containing sector directions and channel use time from neighboring stations.

3. The apparatus or method of any preceding embodiment, wherein said directional transmission information comprises sector directions and channel use times.

4. The apparatus or method of any preceding embodiment, wherein said instructions when executed by the processor perform said transmitting of directional transmission information by appending said directional transmission information within frames of other transmissions or frames generated to contain said directional transmission information.

5. The apparatus or method of any preceding embodiment, wherein frames of other transmissions comprise frames of an extended directional multi-gigabit (EDMG) beacon which incorporates scheduling information including transmission direction information including identification of sector directions and antennas.

6. The apparatus or method of any preceding embodiment, wherein said extended directional multi-gigabit (EDMG) beacon further comprises training fields attached to the EDMG beacon at least in sector directions of scheduled transmission and reception.

7. The apparatus or method of any preceding embodiment, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

8. The apparatus or method of any preceding embodiment, wherein said instructions when executed by the processor further perform said distributed scheduling protocol by scheduling transmission by sector direction and channel use time that is not affected by the already scheduled transmission by other stations, in response to having received directional transmission information from the other stations.

9. The apparatus or method of any preceding embodiment, wherein said instructions when executed by the processor perform said distributed scheduling protocol by first distributing unoccupied sector directions and channel use times, followed by distributing sector directions and channel use times that can be reused when occupied sector directions and times do not affect future scheduled transmissions.

10. The apparatus or method of any preceding embodiment, wherein said instructions when executed by the processor perform said distributed scheduling protocol by first distributing sector directions and channel use times that can be reused when occupied sector directions and channel use times do not affect future scheduled transmissions, followed by distributing unoccupied sector directions and channel use times.

11. The apparatus or method of any preceding embodiment, wherein said instructions when executed by the processor perform said processing of directional transmission information from other stations by comparing transmitter direction and use information of the station with sector direction and channel use time allocation information received from other stations within an extended directional multi-gigabit (EDMG) beacon, and determining if the allocation is in the sector direction of the received EDMG beacon.

12. The apparatus or method of any preceding embodiment, wherein said instructions when executed by the processor perform said receiving and processing of directional transmission information from other stations by avoiding use of sector directions and channel usage times when the station is scheduling future allocations, if these allocations would be in a same direction as a received extended directional multi-gigabit (EDMG) beacon.

13. The apparatus or method of any preceding embodiment, wherein said instructions when executed by the processor perform said processing of directional transmission information from other stations by determining sector directions and channel use times that are affected by allocations contained in the directional transmission information and performing receiver beam training in finding sector directions where received power is above an interference value threshold value, and avoiding allocation of these combinations of sector direction and channel use times.

14. The apparatus or method of any preceding embodiment, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
   (a) a wireless communication circuit configured as a station for wirelessly communicating with at least one other station, using directional communications;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      (i) performing directional communications with another station over a directional antenna sector selected from a plurality of antenna direction sectors; and
      (ii) performing a distributed scheduling protocol comprising (A) transmitting directional transmission information containing sector directions and channel use time within beacons or messages being sent; (B) receiving and processing directional transmission information from other stations; and (C) allocating channels and scheduling future transmissions based on the processed directional transmission information containing sector directions and channel use time from neighboring stations for reusing a channel when future transmission are in directions that do not interfere with currently scheduled transmissions and thus do not affect previously scheduled channel transmissions;
      (iii) wherein said distributed scheduling protocol utilizes a sequence of rules for allocating resources when scheduling service periods (SPs) by either: (D) distributing unoccupied channel resources (time and space) first and then reusing occupied periods of time in times and directions that are not affecting future scheduled transmissions, or by (E) reusing occupied periods of time in directions that are not affecting future scheduled transmissions, before using unoccupied resources in time and space.

2. The apparatus of claim 1, wherein said directional transmission information comprises sector directions and channel use times.

3. The apparatus of claim 1, wherein said instructions when executed by the processor perform said transmitting of directional transmission information by appending said directional transmission information within frames of other transmissions or frames generated to contain said directional transmission information.

4. The apparatus of claim 3, wherein frames of other transmissions comprise frames of an extended directional multi-gigabit (EDMG) beacon which incorporates scheduling information including transmission direction information including identification of sector directions and antennas.

5. The apparatus of claim 4, wherein said extended directional multi-gigabit (EDMG) beacon further comprises training fields attached to the EDMG beacon at least in sector directions of scheduled transmission and reception.

6. The apparatus of claim 1, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

7. The apparatus of claim 1, wherein said instructions when executed by the processor further perform said distributed scheduling protocol by scheduling transmission by sector direction and channel use time that is not affected by the already scheduled transmission by other stations, in response to having received directional transmission information from the other stations.

8. The apparatus of claim 1, wherein said instructions when executed by the processor perform said distributed scheduling protocol by first distributing unoccupied sector directions and channel use times, followed by distributing sector directions and channel use times that can be reused when occupied sector directions and times do not affect future scheduled transmissions.

9. The apparatus of claim 1, wherein said instructions when executed by the processor perform said distributed scheduling protocol by first distributing sector directions and channel use times that can be reused when occupied sector directions and channel use times do not affect future scheduled transmissions, followed by distributing unoccupied sector directions and channel use times.

10. The apparatus of claim 1, wherein said instructions when executed by the processor perform said processing of directional transmission information from other stations by comparing transmitter direction and use information of the station with sector direction and channel use time allocation information received from other stations within an extended directional multi-gigabit (EDMG) beacon, and determining if the allocation is in the sector direction of the received EDMG beacon.

11. The apparatus of claim 1, wherein said instructions when executed by the processor perform said receiving and processing of directional transmission information from other stations by avoiding use of sector directions and channel usage times when the station is scheduling future allocations, if these allocations would be in a same direction as a received extended directional multi-gigabit (EDMG) beacon.

12. The apparatus of claim 1, wherein said instructions when executed by the processor perform said processing of directional transmission information from other stations by determining sector directions and channel use times that are affected by allocations contained in the directional transmission information and performing receiver beam training in finding sector directions where received power is above an interference value threshold value, and avoiding allocation of these combinations of sector direction and channel use times.

13. The apparatus of claim 1, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

14. An apparatus for wireless communication in a network, comprising:
(a) a wireless communication circuit configured as a station for wirelessly communicating with at least one other station, using directional communications;
(b) a processor coupled to said wireless communication circuit within a station configured for operating on a wireless network;
(c) a non-transitory memory storing instructions executable by the processor; and
(d) wherein said instructions, when executed by the processor, perform steps comprising:

(i) performing directional communications with another station over a directional antenna sector selected from a plurality of antenna direction sectors;
(ii) wherein said directional transmission information comprises sector directions and channel use times;
(iii) performing a distributed scheduling protocol comprising (A) transmitting directional transmission information containing sector directions and channel use time within beacons or messages being sent; (B) receiving and processing directional transmission information from other stations; and (C) allocating channels and scheduling future transmissions based on the processed directional transmission information containing sector directions and channel use time from neighboring stations for reusing a channel when future transmission is in directions that do not interfere with currently scheduled transmissions and thus do not affect previously scheduled channel transmissions;
(iv) wherein said receiving and processing of directional transmission information from other stations is performed by comparing transmitter direction and use information of the station with sector direction and channel use time allocation information received from other stations within an extended directional multi-gigabit (EDMG) beacon, and determining if the allocation is in the sector direction of the received EDMG beacon;
(v) wherein said receiving and processing of directional transmission information from other stations is performed by avoiding use of sector directions and channel usage times when the station is scheduling future allocations, if these allocations would be in a same direction as a received extended directional multi-gigabit (EDMG) beacon;
(vi) wherein said receiving and processing of directional transmission information from other stations is performed by determining sector directions and channel use times that are affected by allocations contained in the directional transmission information and performing receiver beam training in finding sector directions where received power is above an interference value threshold value, and avoiding allocation of these combinations of sector direction and channel use times; and
(vii) wherein said distributed scheduling protocol utilizes a sequence of rules for allocating resources when scheduling service periods (SPs) by either: (D) distributing unoccupied channel resources (time and space) first and then reusing occupied periods of time in times and directions that are not affecting future scheduled transmissions, or by (E) reusing occupied periods of time in directions that are not affecting future scheduled transmissions, before using unoccupied resources in time and space.

15. The apparatus of claim 14, wherein said instructions when executed by the processor perform said transmitting of directional transmission information by appending said directional transmission information within frames of other transmissions or frames generated to contain said directional transmission information.

16. The apparatus of claim 15, wherein frames of other transmissions comprise frames of an extended directional multi-gigabit (EDMG) beacon which incorporates scheduling information including transmission direction information including identification of sector directions and antennas.

17. The apparatus of claim 16, wherein said extended directional multi-gigabit (EDMG) beacon further comprises training fields attached to the EDMG beacon at least in sector directions of scheduled transmission and reception.

18. The apparatus of claim 14, wherein said instructions when executed by the processor further perform said distributed scheduling protocol by scheduling transmission by sector direction and channel use time that is not affected by the already scheduled transmission by other stations, in response to having received directional transmission information from the other stations.

19. The apparatus of claim 14, wherein said instructions when executed by the processor perform said distributed scheduling protocol by either:
  (a) first distributing unoccupied sector directions and channel use times, followed by distributing sector directions and channel use times that can be reused when occupied sector directions and times do not affect future scheduled transmissions; or
  (b) first distributing sector directions and channel use times that can be reused when occupied sector directions and channel use times do not affect future scheduled transmissions, followed by distributing unoccupied sector directions and channel use times.

20. A method of performing wireless communication in a network, comprising:
  (a) performing directional communications, by a wireless communication circuit configured as a station on a wireless network configured for wirelessly communicating with at least one other station using directional communications over a directional antenna sector selected from a plurality of antenna direction sectors;
  (b) performing a distributed scheduling protocol comprising (A) transmitting directional transmission information containing sector directions and channel use time within beacons or messages being sent; and (B) receiving and processing directional transmission information from other stations; (C) allocating channels and scheduling future transmissions based on the processed directional transmission information containing sector directions and channel use time from neighboring stations for reusing a channel when future transmission are in directions that do not interfere with currently scheduled transmissions and thus do not affect previously scheduled channel transmissions; and
  (c) following a sequence of rules for allocating resources when scheduling service periods (SPs) by either: (D) distributing unoccupied channel resources (time and space) first and then reusing occupied periods of time, in times and directions that are not affecting future scheduled transmissions, or by (E) reusing occupied periods of time in directions that are not affecting future scheduled transmissions, before using unoccupied resources in time and space.

* * * * *